US011887543B1

(12) United States Patent
Zhou et al.

(10) Patent No.: US 11,887,543 B1
(45) Date of Patent: Jan. 30, 2024

(54) PIXEL DRIVE CIRCUIT, DISPLAY PANEL, AND DISPLAY DEVICE

(71) Applicant: HKC CORPORATION LIMITED, Shenzhen (CN)

(72) Inventors: Xiufeng Zhou, Shenzhen (CN); Xin Yuan, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/068,799

(22) Filed: Dec. 20, 2022

(30) Foreign Application Priority Data

Jun. 24, 2022 (CN) ........................ 202210722406.5

(51) Int. Cl.
*G09G 3/325* (2016.01)
*G09G 3/3258* (2016.01)
*G09G 3/3275* (2016.01)
*G09G 3/3266* (2016.01)
*G09G 3/3233* (2016.01)

(52) U.S. Cl.
CPC .......... *G09G 3/325* (2013.01); *G09G 3/3258* (2013.01); *G09G 3/3266* (2013.01); *G09G 3/3275* (2013.01); *G09G 3/3233* (2013.01); *G09G 2300/0852* (2013.01); *G09G 2330/021* (2013.01)

(58) Field of Classification Search
CPC .... G09G 3/325; G09G 3/3258; G09G 3/3266; G09G 3/3275; G09G 3/3233; G09G 2300/0852
See application file for complete search history.

(56) References Cited

U.S. PATENT DOCUMENTS

2018/0190191 A1 7/2018 Zhai et al.
2018/0190194 A1* 7/2018 Zhu .......................... H01L 27/12
2018/0301092 A1* 10/2018 Ma ........................ G09G 3/3258
2019/0362670 A1* 11/2019 Liu ....................... G09G 3/3233
(Continued)

FOREIGN PATENT DOCUMENTS

CN 105304020 A 2/2016
CN 105427803 A 3/2016
CN 106952615 A 7/2017
(Continued)

*Primary Examiner* — Nitin Patel
*Assistant Examiner* — Saifeldin E Elnafia
(74) *Attorney, Agent, or Firm* — Maier & Maier, PLLC

(57) ABSTRACT

A pixel drive circuit includes: a driving compensation circuitry, a data-writing circuitry, and a flip-elimination circuitry. By configuring the flip-elimination circuitry, the reference voltage can be written to the control end of the drive transistor through the independent circuit line in the compensation phase, thereby it is unnecessary to write the reference voltage through the data-voltage line before each writing of the data voltage. In the writing phase of the data voltage, the entire time of each writing can be used for the writing of data voltage without reserving half of the time for writing the reference voltage, so that the level switch frequency of the data line does not need to reach twice the normal light-emitting frequency, which reduces the burden on the display panel, greatly reduces the power consumption of the screen, and improves product competitiveness.

15 Claims, 3 Drawing Sheets

(56) References Cited

U.S. PATENT DOCUMENTS

2020/0294449 A1 * 9/2020 Wang .................. G09G 3/3233

FOREIGN PATENT DOCUMENTS

| | | | |
|---|---|---|---|
| CN | 108604433 | A | 9/2018 |
| CN | 110910834 | A | 3/2020 |
| CN | 111383598 | A | 7/2020 |
| CN | 113393788 | A | 9/2021 |

* cited by examiner

PIXEL DRIVE CIRCUIT, DISPLAY PANEL, AND DISPLAY DEVICE

CROSS-REFERENCE TO RELATED APPLICATION

Pursuant to 35 U.S.C. § 119 and the Paris Convention, this application claims the benefit of Chinese Patent Application No. 202210722406.5 filed Jun. 24, 2022, the content of which is incorporated herein by reference.

FIELD

The present application relates to the field of display technology, and in particular, to a pixel drive circuit, a display panel and a display device.

BACKGROUND

The statements provided herein are merely background information related to the present application, and do not necessarily constitute any prior arts. With the development of the field of liquid crystal display, the advantages of the organic light-emitting display (OLED) display technology, such as self-luminous, thin and lightness, have gradually been widely used in TV, mobile phones, notebooks and other products. Because the OLED is a current-driven device, when the threshold voltage Vth of the thin film transistor (TFT) shifts, the driving current of the OLED will not be stable and will change, resulting in uneven brightness. Currently, the current compensation is performed by a drive-compensation circuit. The drive-compensation circuit includes a TFT and a capacitor, and the TFT is connected to a pixel element. The control end of the TFT is connected to a data voltage, the input end of the TFT is connected to a drive voltage, and the capacitor is connected between the output end and the control end, so that a voltage written into the pixel element can be regulated through a control of the data voltage. However, it is necessary to reserve a part of time for the control end of the TFT to read a Vref compensation potential before each writing of the data voltage. Generally, half of the time that is used for writing the data voltage needs to be reserved for the read of Vref, thereby the switch frequency of the data voltage has to be doubled, such as, at a display frequency of 60 Hz, the switch frequency of the data voltage needs to reach 120 Hz. The existing compensation method thus has some shortcomings.

SUMMARY

The present application provides a pixel drive circuit, a display panel and a display device, aiming at solving the problem that parasitic charges in the compensation circuit cannot be eliminated in the exemplary technology.

In accordance with an aspect of the present application, a pixel drive circuit is provided, which is applied to a display panel, the display panel includes a plurality of pixels, each pixel includes a plurality of sub-pixel elements. The pixel drive circuit includes: a drive compensation circuitry, a data-writing circuitry, and a flip-elimination circuitry.

The drive compensation circuitry includes a drive transistor and a storage capacitor, an input end of the drive transistor is coupled to a drive-voltage terminal, and an output end of the drive transistor is coupled to one of the plurality of sub-pixel elements.

An output end of the data-writing circuitry is coupled to a control end of the drive transistor, to write a data voltage to the control end of the drive transistor in the writing phase; and The flip-elimination circuitry is configured to write a reference voltage to the control end of the drive transistor through an independent circuit line in a compensation phase, to eliminate a voltage flip formed due to a switching between the data voltage and the reference voltage in the writing phase of the data voltage.

In an optional embodiment, the data-writing circuitry includes a data-writing control transistor, a control end of the data-writing control transistor is coupled to a first gate-control-signal line, an input end of the data-writing control transistor is coupled to a data-voltage terminal, and an output end of the data-writing control transistor is coupled to the control end of the drive transistor.

In an optional embodiment, the pixel drive circuit further includes an input control transistor, a control end of the input control transistor is coupled to an emission-signal line, an input end of the input control transistor is coupled to a drive-voltage terminal, and an output end of the input control transistor is coupled to the input end of the drive transistor.

In an optional embodiment, the pixel drive circuit also includes a reset circuitry, the reset circuitry, in response to a reset-response voltage output by a reset-response-voltage line, is configured to pull down a voltage at one end of the storage capacitor that is coupled to the sub-pixel element to a reset voltage.

In an optional embodiment, the reset circuitry includes a reset transistor, a control end of the reset transistor is coupled to a second gate-control-signal line, and input and output ends of the reset transistor are coupled between the output end of the drive transistor and a reset-voltage terminal.

In an optional embodiment, the flip-elimination circuitry includes a flip-elimination transistor, a control end of the flip-elimination transistor is coupled to a third gate-control-signal line, and input and output ends of the flip-elimination transistor are respectively coupled to the control end of the drive transistor and a reference-voltage line.

In an optional embodiment, the flip-elimination circuitry also includes a flip capacitor, one end of the flip capacitor is coupled to the output end of the drive transistor, and another end is coupled to the control end of the drive transistor.

In an optional embodiment, the pixel drive circuits are cascaded in the display panel, the first gate-control-signal line, the second gate-control-signal line and the third gate-control-signal line are respectively corresponding to a gate-signal line of a pixel drive circuit at a post-stage adjacent to a pixel drive circuit at a current stage, a gate-signal line of a pixel drive circuit at a fore-stage adjacent to the pixel drive circuit at the current stage, and a gate-signal line of the pixel drive circuit at the current stage.

In accordance with a second aspect of the present application, a method for driving a pixel is provided, which is applied to the above pixel drive circuit, including steps of: writing the reference voltage to the control end of the drive transistor through the independent circuit line in the compensation phase of a driving cycle; and writing the data voltage to the control end of the drive transistor in the writing phase of the driving cycle, to control the pixel element to emit light.

In accordance with a third aspect of the present application, a display panel is provided, which includes: a plurality of pixels and a plurality of pixel drive circuits as described above, each pixel includes a plurality of sub-pixel elements. The plurality of pixel drive circuits are coupled to the plurality of sub-pixel elements in a one-to-one correspondence.

In accordance with a fourth aspect of the present application, a display device is provided, which includes a display panel and the pixel drive circuit as described above, the display panel includes a plurality of pixels, and each pixel includes a plurality of light-emitting devices.

It can be seen from the above solutions that the present application provides a pixel drive circuit, a display panel and a display device. By configuring a flip-elimination circuitry, the present application can write a reference voltage to the control end of the drive transistor through an independent circuit line in the compensation phase, thereby it is unnecessary to write the reference voltage through the data-voltage line before each writing of the data voltage. In the writing phase of the data voltage, the entire time of each writing can be used for the writing of the data voltage without reserving half of the time for writing the reference voltage, so that the level switch frequency of the data line does not need to reach twice the normal light-emitting frequency, which reduces the burden on the display panel, greatly reduces the power consumption of the screen, and improves product competitiveness.

BRIEF DESCRIPTION OF THE DRAWINGS

In order to illustrate the embodiments of the present application more clearly, the following will briefly introduce the drawings that need to be used for describing the embodiments or exemplary technologies. Obviously, the drawings in the following description are merely some embodiments of the present application, and for those of ordinarily skills in the art, other drawings can also be obtained according to these drawings without any creative effort.

DETAILED DESCRIPTION OF THE EMBODIMENTS

In order to make the objectives, solutions and beneficial effects of the present application more comprehensible, the present application will be further described in detail below with reference to the drawings and embodiments. It should be understood that the specific embodiments described herein are only used to explain the present application, but not to limit the present application.

In addition, the terms “first” and “second” are only used for descriptive purposes, and should not be construed as indicating or implying relative importance or implying the number of the feature indicated. Thus, a feature defined as “first” or “second” may expressly or implicitly include one or more of that feature. In the description of the present application, the phrase “a/the plurality of” means two or more, unless otherwise expressly and specifically defined. It should be noted that the pixel drive circuit, display panel and display device disclosed in this application may be used in the field of display technology, and may also be used in any field other than the field of display technology. The application field of the pixel drive circuit, display panel and display device disclosed in this application will not be limited here.

Figure 1:
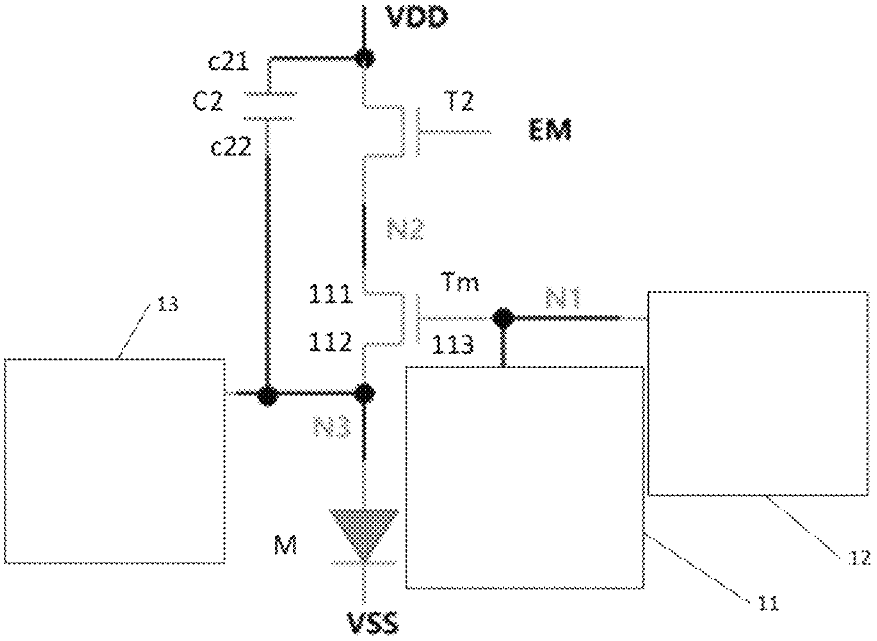
FIG. 1 is a schematic diagram of a circuitry structure of a pixel drive circuit in accordance with an embodiment of the present application.

FIG. 1 is a schematic structural diagram of a pixel drive circuit provided by an embodiment of the present application. It should be noted that the pixel drive circuit of the present application is applied to a display panel, and the display panel includes a plurality of pixels, and each pixel includes a plurality of sub-pixel elements. The plurality of pixel drive circuits are coupled to the plurality of sub-pixel elements in a one-to-one correspondence.

As shown in FIG. 1, the pixel drive circuit specifically includes: a drive compensation circuitry, a data-writing circuitry 12, and a flip-elimination circuitry 11. The drive compensation circuitry includes a drive transistor Tm and a storage capacitor C2. An input end 111 of the drive transistor Tm is coupled to a drive-voltage terminal VDD, and an output end 112 of the drive transistor Tm is coupled to one sub-pixel element M. An output end of the data-writing circuitry 12 is coupled to a control end 113 of the drive transistor Tm for writing a data voltage to the control end 113 of the drive transistor Tm.

The flip-elimination circuitry 11 is configured to write a reference voltage to the control end of the drive transistor Tm through an independent circuit line in a compensation phase, to eliminate a voltage flip formed due to a switching between the data voltage and the reference voltage in a writing phase of the data voltage.

In the embodiments of the present application, the sub-pixel element may be a red pixel element, a blue pixel element or a green pixel element, that is, a red sub-pixel, a blue sub-pixel, and a green sub-pixel. Generally, three pixel elements constitute a pixel, which is the smallest integrated unit that constitutes a pixel arrangement structure. The pixel arrangement structure constitutes a display area of the display panel, that is, the pixel arrangement includes a plurality of pixels arranged in a specific arrangement, and each pixel includes a plurality of pixel elements, such as red pixel elements, blue pixel elements and green pixel elements, each pixel element is electrically connected to a driver IC (integrated circuit) through an independent drive line, and the pixel elements in the pixel are powered on by a driving of the driver IC to emit colored light.

It should be noted that, in the present application, the pixel elements in one pixel may include a red pixel element, a blue pixel element and a green pixel element, and the number of pixel elements in one pixel may be three or four, which will not be limited herein.

In case that the number of pixel elements in one pixel is three, the three pixel elements are generally a red pixel element, a blue pixel element and a green pixel element. In case that the number of pixel elements is four, the colors of the four pixel elements may respectively be: red, blue, green, and one other color. The other color may be different from red, blue, and green, such as white, yellow, or cyan. It should be noted that if the other color is white, the display brightness of the display device where the pixel arrangement is located can be improved. If the other color is other colors, the color gamut of the display device can be increased, which is not limited here.

Figure 2:
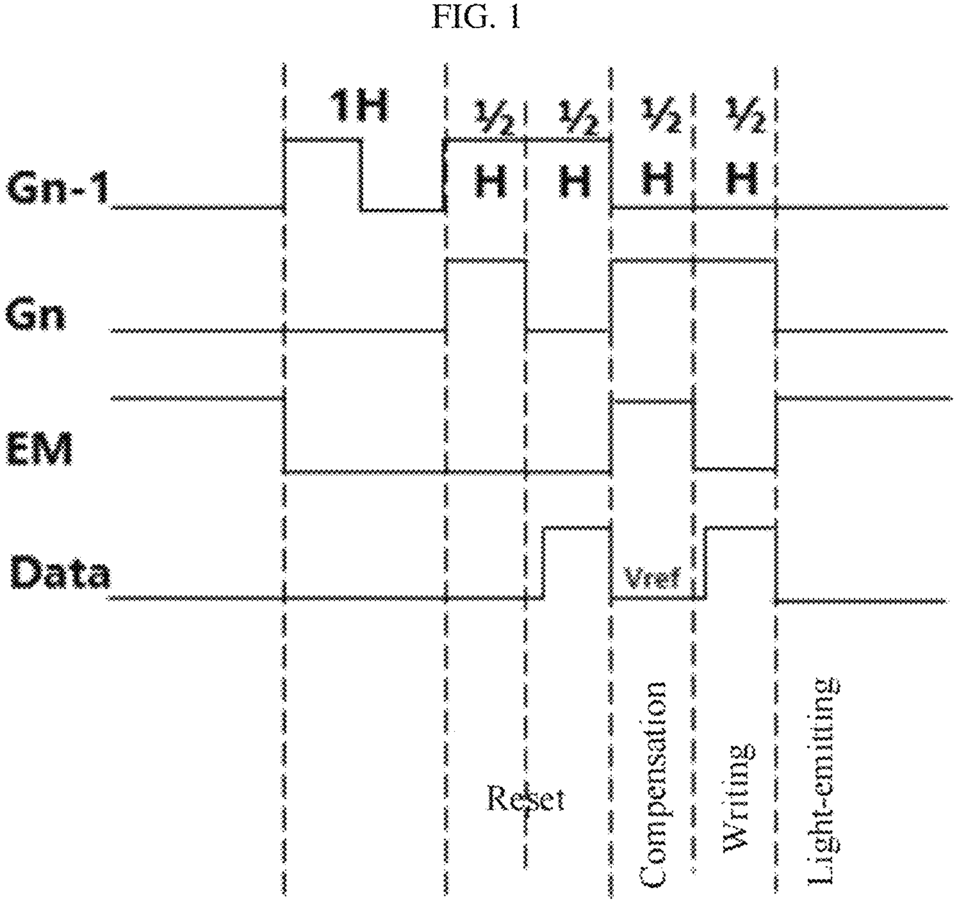
FIG. 2 is a schematic time-sequence diagram of signal lines of a pixel drive circuit in an exemplary technology.

Currently, operation phases of the pixel drive circuit include a reset phase, a compensation phase, a writing phase, and a light-emitting phase. In an operation process of this circuit structure, the most critical is the operation of the drive transistor Tm. Before writing a data, a reset compensation potential needs to be read through a gate control node of the drive transistor Tm. The potential input to the control end of the drive transistor Tm is only controlled by a voltage input end. Thus, the time for data-writing in any row needs to be divided into two parts, half of the time ½ H is used for writing a Reset, and only half of the time ½H can be left for writing the data, as shown in FIG. 2. Therefore, under a normal frequency of 60 HZ, the switch frequency of data has reached 120 HZ, which greatly increases the power consumption of the screen, and when the use frequency of the display screen increases, the charging time will be further shortened, which cannot meet the requirements of customers and the market.

In the present application, by configuring the flip-elimination circuitry 11, the reference voltage Vref can be written to the control end of the drive transistor Tm through the independent circuit line in the compensation phase, it thus is unnecessary to write the reference voltage Vref through a data-voltage line before each writing of the data voltage. In the writing phase of the data voltage, the entire time of each writing can be used for the writing of the data voltage without reserving half of the time for writing the reference voltage Vref, so that the level switch frequency of the data line does not need to reach twice the normal light-emitting frequency, which reduces the burden on the display panel, greatly reduces the power consumption of the screen and improves product competitiveness.

Further, it should be understood that the transistor in the present application is a thin-film transistor (TFT). In some embodiments, part of the pixel drive circuit may be arranged in a non-display area of the display panel. In some embodiments, the transistor may also be other types of transistors, which will not be limited herein.

The transistor in the present application generally includes a control end, an input end, and an output end. Correspondingly, the control end is the gate of the transistor, and the input end and the output end are the source and drain of the transistor.

In a preferred embodiment, the data-writing circuitry of the present application includes a data-writing control transistor T1. A control end of the data-writing control transistor T1 is coupled to a first gate-control-signal line, an input end of the data-writing control transistor T1 is coupled to a data-voltage terminal, and an output end of the data-writing control transistor T1 is coupled to the control end of the drive transistor.

The data-writing control transistor T1 is configured to control the timing for writing through the data-voltage line to write the control end of the drive transistor Tm, and then the data voltage written into the control end of the drive transistor Tm can be controlled through a conduction of the data-writing control transistor T1 in the reset, compensation, writing and light-emitting phases.

Further, in a preferred embodiment, the pixel drive circuit also includes an input control transistor T2. A control end of the input control transistor T2 is coupled to an emission-signal line EM, an input end of the input control transistor T2 is coupled to a drive-voltage terminal VDD, and an output end of the input control transistor T2 is coupled to the input end 111 of the drive transistor Tm. In this embodiment, the timing at which the drive voltage is written into the drive transistor Tm is controlled by the input control transistor T2, so that the drive transistor Tm can be controlled differently at different phases.

It should be understood that, generally speaking, a signal output through the emission-signal line EM is generated by a voltage of an emission power source, a clock signal and a scan signal, which will not be further described in here.

Further, as shown in FIG. 1, in some embodiments, two ends of the storage capacitor C2 of the present application are respectively coupled to the drive-voltage terminal VDD and the output end of the drive transistor Tm. In this embodiment, the storage capacitor C2 is configured to stabilize the voltage at the node N3 in FIG. 1, thereby suppressing the problem of current-leakage at the output end of the drive transistor Tm.

In addition, in some embodiments, the pixel drive circuit also includes a reset circuitry. The reset circuitry is configured to pull down the voltage at one end of the storage capacitor that is coupled to the sub-pixel element to a reset voltage, in response to a reset-response voltage output through a reset-response-voltage line.

Figure 3:
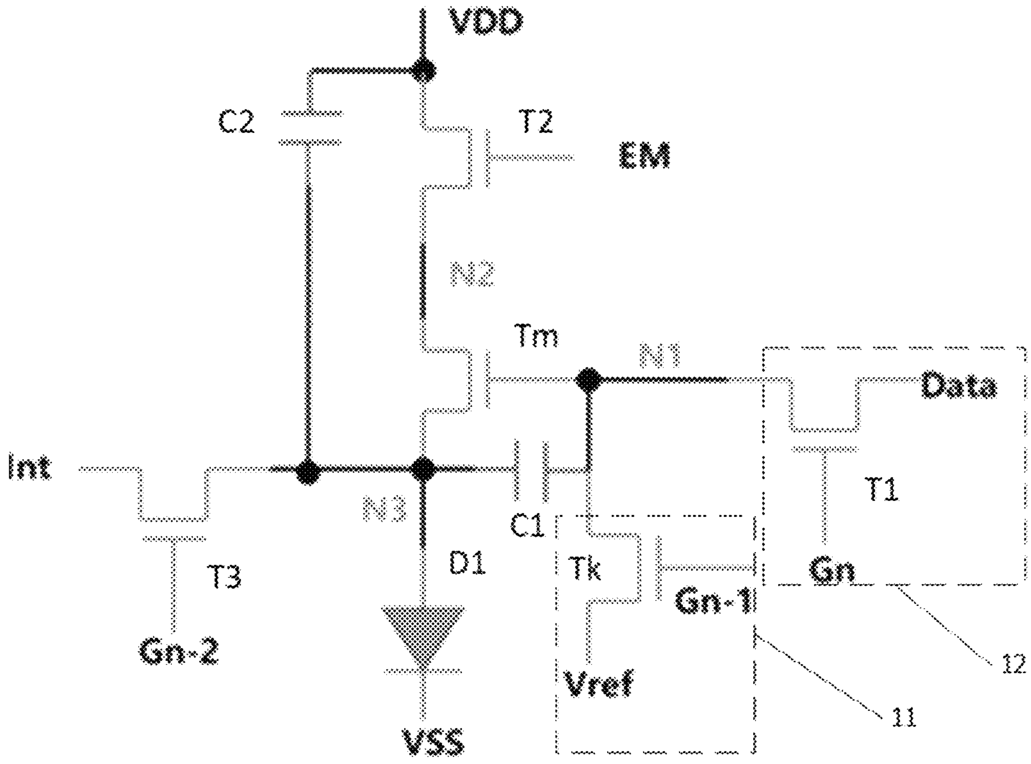
FIG. 3 is a schematic structural diagram of a pixel drive circuit in the embodiment of the present application.

In some embodiments, as shown in FIG. 3, the reset circuitry specifically includes a reset transistor T3. A control end of the reset transistor T3 is coupled to a second gate-control-signal line Gn-2, and input and output ends of the reset transistor T3 are coupled between the output end of the drive transistor Tm and a reset-voltage terminal (an output end of a reset-signal line Int). The reset transistor T3 is configured to reset the voltage between the drive transistor Tm and the pixel element in the reset phase to the reset voltage when the drive transistor Tm is switched off.

The flip-elimination circuitry of the present application will be described in detail below. In the present application, the flip-elimination circuitry can eliminate the switching between the reference voltage Vref and the data voltage for each witting of the data-voltage line, that is, only the data voltage needs to be output by the data-voltage line in the compensation or writing phase, so that the switch frequency of the data voltage does not need to be twice the light-emitting frequency.

In an exemplary embodiment of the present application, the flip-elimination circuitry includes a flip-elimination transistor Tk. A control end of the flip-elimination transistor Tk is coupled to a third gate-control-signal line Gn-1, and input and output ends of the flip-elimination transistor Tk are respectively coupled to the control end of the drive transistor Tm and a reference-voltage line Vref.

In this embodiment, the flip-elimination transistor Tk is coupled to a gate-control-signal line (the third gate-control-signal line Gn-1 in FIG. 3), the reference voltage Vref is transmitted to the control end of the drive transistor Tm, and also to the N1 node in FIG. 3, when a high level is output from the third gate-control-signal line Gn-1, so that the voltage at the N1 node is flipped from the data voltage to the reference voltage Vref, and thus it is unnecessary for the data-voltage line to switch between the reference voltage Vref and the data voltage.

Further, the flip-elimination circuitry in the present application may also include that a clock-signal line is coupled with a transistor to form a flip-elimination. A high level of the clock-signal line is the reference voltage Vref, so that the reference voltage Vref can be controlled, by the transistor, to be written to the N1 node in the writing phase, which will not be further described in here.

In a preferred embodiment, the flip-elimination circuitry also includes a flip capacitor C1, one end of the flip capacitor C1 is coupled to the output end of the drive transistor Tm, and another end of the flip capacitor C1 is coupled to the control end of the drive transistor Tm. In this embodiment, by arranging the flip capacitor C1, the potential at the N3 node can be pulled high, thereby further avoiding a voltage attenuation at the N3 node.

Figure 4:
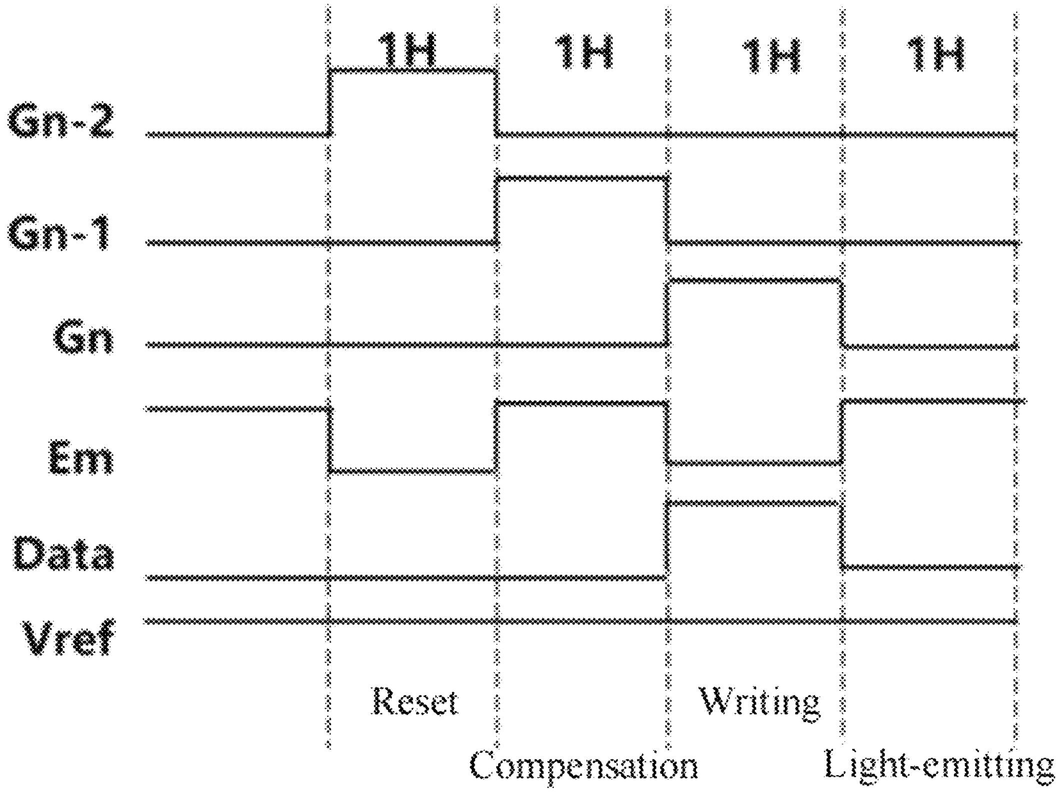
FIG. 4 is a schematic sequential control diagram of each signal line in FIG. 2.

In addition, in a preferred embodiment, as shown in FIG. 4, the pixel drive circuits are arranged in cascade in the display panel, that is, a gate-signal line of the pixel drive circuit at a fore-stage according to the corresponding relationship of the sub-pixels is further multiplexed to the pixel drive circuit at a post-stage and at a stage after the post-stage. The pixel drive circuit at a current stage is at the (n−1)-th stage, the adjacent fore-stage is the (n−2)-th stage, and the adjacent post-stage is the n-th stage. That is, the first gate-control-signal line, the second gate-control-signal line and the third gate-control-signal line are respectively corresponding to: the gate-signal line Gn1 of the pixel drive circuit at the fore-stage adjacent to the pixel drive circuit at the current stage, the gate-signal line Gn-2 of the pixel drive circuit at the post-stage adjacent to the pixel drive circuit at the current stage, and the gate-signal line Gn-1 of the pixel drive circuit at the current stage, which will not be further described in here.

Figure 5:
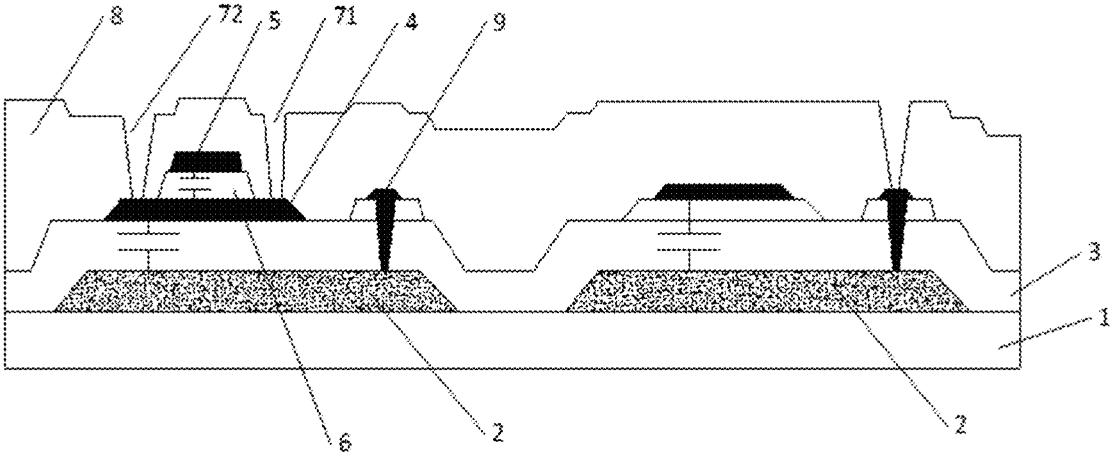
FIG. 5 is a schematic structural diagram of a flip-elimination transistor in a preferred embodiment of the present application.

In addition, in a preferred embodiment, the flip-elimination transistor Tk is a four-terminal device, as shown in FIG. 5, the flip-elimination transistor Tk includes: a substrate 1; a first metal layer 2 formed on a side surface of the substrate 1; an active layer 4 formed on a side of the first metal layer 2 away from the substrate 1; and a transistor structure arranged on a side of the active layer 4 away from the first metal layer 2. The transistor structure includes a gate constituted by a second metal layer 5, and a source (formed by depositing metal from a via hole 72 in FIG. 1) and a drain (formed by depositing metal from a via hole 71 in FIG. 1) located on two sides of the second metal layer 5 and in electrical contact with the active layer 4. The first metal layer 2 is coupled to a DC-voltage terminal.

In this embodiment, the first metal layer is arranged, and the first metal layer is coupled to the DC voltage terminal. Compared with the 3-terminal TFT in the exemplary technology, a capacitor Cgd2 is added, and an area of a plate of the capacitor Cgd2 can be configured in a relatively unrestricted environment, which on the one hand, enables the capacitor Cgd2 to be made larger, and on the other hand, enables the value of the capacitor of Cgd2 to be flexibly adjusted. In this way, the TFT is made into a 4-terminal device in the present application, a layer of metal disposed on a side of the bottom insulation layer opposite to a bottom surface of the device serves as a bottom gate of the device. The bottom gate is connected to a DC signal in the circuit. Capacitors Cgd2, Cgs2 are respectively formed between the bottom gate and the source and drain of the device, as an area of the bottom gate usually covers other electrodes of the entire device, the newly formed capacitors Cgd2, Cgs2 have larger capacitance values. Because a potential variation at the control end of the drive TFT depends on the parasitic capacitor of the TFT and the storage capacitor of the control end of the drive TFT as well as the capacitance value of the newly formed capacitor Cgd2, so the capacitors Cgd2 and Cgs2 may serve as a fixed voltage-stabilization capacitor, when a coupling effect of the capacitor occurs, to effectively offset the feed-through effect of the capacitors Cgd, Cgs, which further ensures the display effect of pixels.

The present application will be described in detail below with reference to the time-sequence diagram shown in FIG. 4.

First, in the reset phase, the emission-signal line EM is switched to a low level, at this time, the input control transistor T2 is switched off, the drive voltage signal is blocked, a high level is written to the second gate-control-signal line Gn-2, the reset transistor T3 is switched on, and the reset voltage is written to the anode potential of the pixel element.

Then, in the compensation phase, the potential of the second gate-control-signal line Gn-2 is pulled low, the reset transistor T3 is switched off, and the potential of the emission-signal line EM is pulled high, then the input control transistor T2 is switched on. The drive voltage is written to the N2 node, and the drive voltage is higher than the reset voltage, meanwhile, the potential of the first gate-control-signal line Gn is pulled high, and the flip-elimination transistor Tk is switched on. The reference voltage Vref is written to the N1 node, and meanwhile the flip capacitor C1 is charged, the drive transistor Tm is switched on, and the potential of the drive voltage flows into the N3 node, until the potential causes the drive transistor Tm to be switched off.

After that, in the writing phase, the potentials of the third gate-control-signal line Gn-1, the second gate-control-signal line Gn-2 and the emission-signal line EM are all pulled low, then the flip-elimination transistor Tk, the input control transistor T2 and the reset transistor T3 are all switched off. The potential of the first gate-control-signal line Gn is pulled high, then the data-writing control transistor T1 is switched on, and the data voltage is written to the N1 node.

Finally, in the light-emitting phase, the potentials of the first gate-control-signal line Gn, the second gate-control-signal line Gn-2 and the third gate-control-signal line Gn-1 are all pulled low, and then the data-writing control transistor T1, the flip-elimination transistor Tk and the reset transistor T3 are all switched off, the potential at the N2 node is maintained, enabling the drive transistor Tm to remain conductive, the potential of the emission-signal line EM is pulled high to switch on the input control transistor T2. The drive voltage, passing through the input control transistor T2 and the drive transistor Tm, is input to the anode of the pixel element, thereby providing holes for the OLED light-emitting device, and emitting light in combination with the electrons transmitted from the cathode.

Further, in the embodiments of the present application, under high temperature, due to the increase of the leakage current of the panel, the current of the panel may be recharged to the drive-voltage terminal VDD, thereby affecting the current stability provided by the drive-voltage terminal VDD. The diode element of the present application can prevent the large current at the panel side from flowing back to the drive-voltage terminal VDD.

It should be understood for those of ordinary skill in the art that the term “coupling/coupled to” in the present application can be a direct or indirect electrical connection. For example, if A and B are coupled, A may be directly electrically connected to B, or A may be electrically connected to B through C, which will not be limited here.

In accordance with a third aspect of the present application, a display panel is provided, which includes: a plurality of pixels and a plurality of pixel drive circuits as described above, each pixel includes a plurality of sub-pixel elements. The plurality of pixel drive circuits are coupled to the plurality of sub-pixel elements in a one-to-one correspondence.

In the display panel provided by the present application, by configuring a flip-elimination circuitry, a reference voltage can be written to the control end of the drive transistor through an independent circuit line in the compensation phase, it thus is unnecessary to write the reference voltage through the data-voltage line before each writing of the data voltage. In the writing phase of the data voltage, the entire time of each writing can be used for the writing of data voltage without reserving half of the time for writing the reference voltage, so that the level switch frequency of the data line does not need to reach twice the normal light-emitting frequency, which reduces the burden on the display panel, greatly reduces the power consumption of the screen, and improves product competitiveness.

Figure 6:
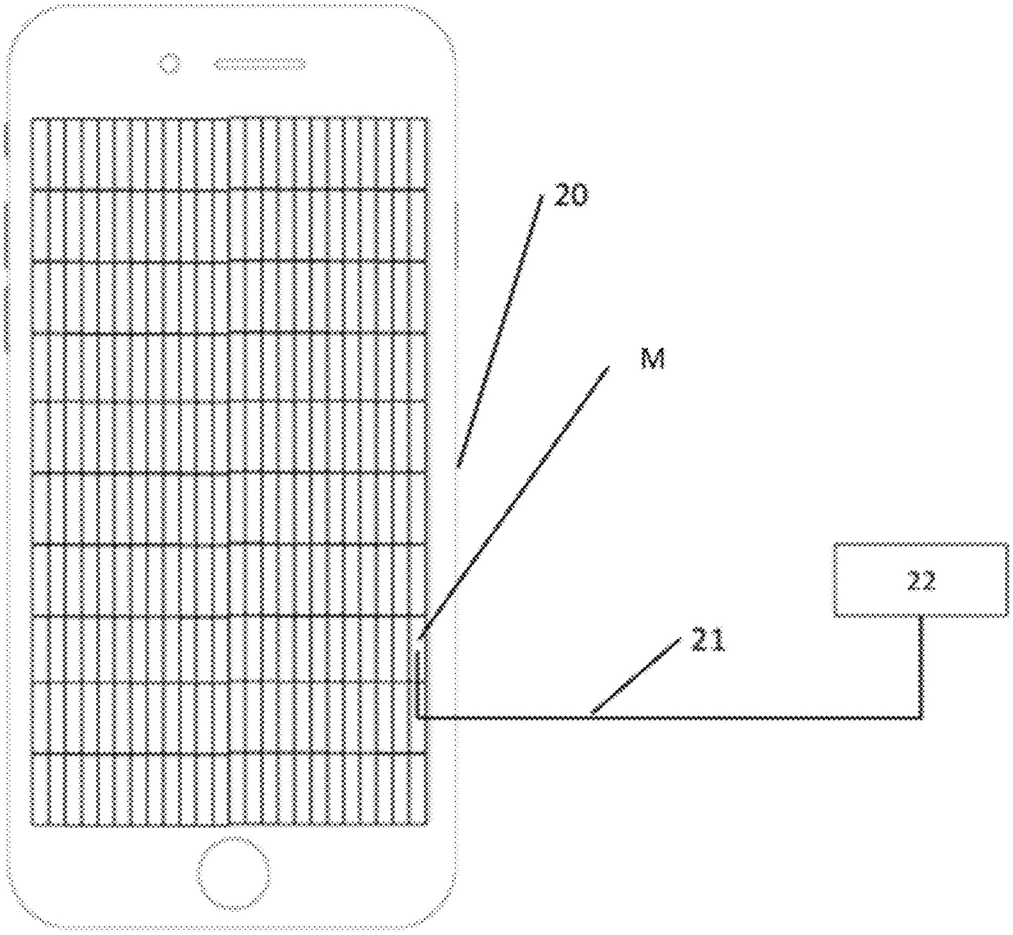
FIG. 6 is a schematic structural diagram of a display device in accordance with an embodiment of the present application.

As shown in FIG. 6, a display device 20 in an embodiment of the present application includes a display panel and a pixel drive circuit 22 as above-described. The display panel includes a plurality of pixels, and each pixel includes a plurality of sub-pixel elements M, each sub-pixel element M is coupled to the pixel drive circuit of the present application through wires 21.

In a specific implementation, the display device provided by an embodiment of the present application may be any product or component having a display function, such as a mobile phone, a tablet computer, a television, a monitor, a notebook computer, a digital photo frame, and a navigator.

In an embodiment of the present application, it is also provided a driving method of a display device, the driving method is performed by the pixel drive circuit as the above-mentioned, and specifically includes steps of: writing the reference voltage to the control end of the drive transistor through the independent circuit line in the compensation phase of a driving cycle; and writing the data voltage to the control end of the drive transistor in the writing phase of the driving cycle, to control the pixel element to emit light.

The above steps of the present application will be described in detail below with reference to the embodiments shown in FIG. 1 and FIG. 2.

FIG. 4 shows the sequential control diagram corresponding to the embodiment shown in FIG. 3, as shown in FIG. 4, the entire process includes four phases.

First, in the reset phase, the emission-signal line EM is switched to a low level, at this time, the input control transistor T2 is switched off, the drive voltage signal is blocked, a high level is written to the second gate-control-signal line Gn-2, the reset transistor T3 is switched on, and the reset voltage is written to the anode potential of the pixel element.

Then, in the compensation phase, the potential of the second gate-control-signal line Gn-2 is pulled low, the reset transistor T3 is switched off, and the potential of the emission-signal line EM is pulled high, then the input control transistor T2 is switched on. The drive voltage is written to the N2 node, and the drive voltage is higher than the reset voltage, meanwhile, the potential of the first gate-control-signal line Gn is pulled high, and the flip-elimination transistor Tk is switched on. The reference voltage Vref is written to the N1 node, and meanwhile the flip capacitor C1 is charged, the drive transistor Tm is switched on, and the potential of the drive voltage flows into the N3 node, until the potential causes the drive transistor Tm to be switched off.

After that, in the writing phase, the potentials of the third gate-control-signal line Gn-1, the second gate-control-signal line Gn-2 and the emission-signal line EM are all pulled low, then the flip-elimination transistor Tk, the input control transistor T2 and the reset transistor T3 are all switched off. The potential of the first gate-control-signal line Gn is pulled high, then the data-writing control transistor T1 is switched on, and the data voltage is written to the N1 node.

Finally, in the light-emitting phase, the potentials of the first gate-control-signal line Gn, the second gate-control-signal line Gn-2 and the third gate-control-signal line Gn-1 are all pulled low, and then the data-writing control transistor T1, the flip-elimination transistor Tk and the reset transistor T3 are all switched off, the potential at the N2 node is maintained, enabling the drive transistor Tm to remain conductive, the potential of the emission-signal line EM is pulled high to switch on the input control transistor T2. The drive voltage, passing through the input control transistor T2 and the drive transistor Tm, is input to the anode of the pixel element, thereby providing holes for the OLED light-emitting device, and emitting light in combination with the electrons transmitted from the cathode.

It can be seen from the above solutions that, in the driving method in accordance with an embodiment of the present application, a reference voltage can be written to the control end of the drive transistor through an independent circuit line in the compensation phase, it thus is unnecessary to write the reference voltage through the data-voltage line before each writing of the data voltage. In the writing phase of the data voltage, the entire time of each writing can be used for the writing of data voltage without reserving half of the time for writing the reference voltage, so that the level switch frequency of the data line does not need to reach twice the normal light-emitting frequency, which reduces the burden on the display panel, greatly reduces the power consumption of the screen, and improves product competitiveness.

It should be noted that, the embodiments of the drive circuit, the embodiments of the display device, and the embodiments of the driving method and the debugging method provided by the present application may all refer to each other, which are not limited in the embodiments of the present application. Steps of the method for manufacturing a display panel provided by the embodiments of the present application can be correspondingly increased or decreased according to actual situations. Variations of these methods that can be easily conceived by those skilled artists who are familiar with the field disclosed in the present application should all be covered within the protection scope of the present application, which will not be further described in the present application.

The above descriptions are merely optional embodiments of the present application, and are not intended to limit the present application. Any modifications, equivalent replacements, improvements, etc. made within the fundamental and principles of the present application shall be included within the protection scope of the present application.

What is claimed is:

1. A pixel drive circuit, applied to a display panel, the display panel comprising a plurality of pixels, each pixel comprising a plurality of sub-pixel elements, and the pixel drive circuit comprising:

- a drive compensation circuitry, comprising a storage capacitor and a drive transistor, wherein an input end of the drive transistor is coupled to a drive-voltage terminal, and an output end of the drive transistor is coupled to one of the plurality of sub-pixel elements;
- a data-writing circuitry, wherein an output end of the data-writing circuitry is coupled to a control end of the drive transistor, to write a data voltage to the control end of the drive transistor in a writing phase; and
- a flip-elimination circuitry, wherein the flip-elimination circuitry is configured to write a reference voltage to the control end of the drive transistor through an independent circuit line in a compensation phase, to eliminate a voltage flip formed due to a switching between the data voltage and the reference voltage in the writing phase of the data voltage, and wherein the flip-elimination circuitry comprises a flip-elimination transistor, the flip-elimination transistor is a four-terminal device, wherein a control end of the flip-elimination transistor is coupled to a third gate-control-signal line, an input end of the flip-elimination transistor is coupled to the control end of the drive transistor, an output end of the flip-elimination transistor is coupled to a reference-voltage line, and a bottom gate of the flip-elimination transistor is coupled to a direct-current signal line.

2. The pixel drive circuit according to claim 1, wherein the data-writing circuitry comprises a data-writing control transistor, a control end of the data-writing control transistor is coupled to a first gate-control-signal line, an input end of the data-writing control transistor is coupled to a data-voltage terminal, and an output end of the data-writing control transistor is coupled to the control end of the drive transistor.

3. The pixel drive circuit according to claim 2, wherein the pixel drive circuit further comprises a reset circuitry, and the reset circuitry is configured to pull down a voltage at one end of the storage capacitor that is coupled to the sub-pixel element to a reset voltage, in response to a reset-response voltage output by a reset-response-voltage line.

4. The pixel drive circuit according to claim 3, wherein the reset circuitry comprises a reset transistor, a control end of the reset transistor is coupled to a second gate-control-signal line, and input and output ends of the reset transistor are coupled between the output end of the drive transistor and a reset-voltage terminal.

5. The pixel drive circuit according to claim 1, wherein the pixel drive circuit further comprises an input control transistor, a control end of the input control transistor is coupled to an emission-signal line, an input end of the input control transistor is coupled to a drive-voltage terminal, and an output end of the input control transistor is coupled to the input end of the drive transistor.

6. The pixel drive circuit according to claim 1, wherein the flip-elimination circuitry further comprises a flip capacitor, one end of the flip capacitor is coupled to the output end of the drive transistor, and another end of the flip capacitor is coupled to the control end of the drive transistor.

7. The pixel drive circuit according to claim 1, wherein the pixel drive circuits are cascaded in the display panel, the first gate-control-signal line, the second gate-control-signal line and the third gate-control-signal line are respectively corresponding to a gate-signal line of a pixel drive circuit at a post-stage adjacent to a pixel drive circuit at a current stage, a gate-signal line of a pixel drive circuit at a fore-stage adjacent to the pixel drive circuit at the current stage, and a gate-signal line of the pixel drive circuit at the current stage.

8. A display panel, comprising:

a plurality of pixels, each pixel comprising a plurality of sub-pixel elements; and a plurality of pixel drive circuits, wherein the plurality of pixel drive circuits are coupled to the plurality of sub-pixel elements in a one-to-one correspondence, and each pixel drive circuit comprises:

a drive compensation circuitry, comprising a storage capacitor and a drive transistor, wherein an input end of the drive transistor is coupled to a drive-voltage terminal, and an output end of the drive transistor is coupled to one of the plurality of sub-pixel elements;

a data-writing circuitry, wherein an output end of the data-writing circuitry is coupled to a control end of the drive transistor, to write a data voltage to the control end of the drive transistor in a writing phase; and a flip-elimination circuitry, wherein the flip-elimination circuitry is configured to write a reference voltage to the control end of the drive transistor through an independent circuit line in a compensation phase, to eliminate a voltage flip formed due to a switching between the data voltage and the reference voltage in the writing phase of the data voltage, wherein the flip-elimination circuitry comprises a flip-elimination transistor, the flip-elimination transistor is a four-terminal device, wherein a control end of the flip-elimination transistor is coupled to a third gate-control-signal line, an input end of the flip-elimination transistor is coupled to the control end of the drive transistor, an output end of the flip-elimination transistor is coupled to a reference-voltage line, and a bottom gate of the flip-elimination transistor is coupled to a direct-current signal line.

9. The display panel according to claim 8, wherein the data-writing circuitry comprises a data-writing control transistor, a control end of the data-writing control transistor is coupled to a first gate-control-signal line, an input end of the data-writing control transistor is coupled to a data-voltage terminal, and an output end of the data-writing control transistor is coupled to the control end of the drive transistor.

10. The display panel according to claim 9, wherein each pixel drive circuit further comprises a reset circuitry, and the reset circuitry is configured to pull down a voltage at one end of the storage capacitor that is coupled to the sub-pixel element to a reset voltage, in response to a reset-response voltage output by a reset-response-voltage line.

11. The display panel according to claim 10, wherein the reset circuitry comprises a reset transistor, a control end of the reset transistor is coupled to a second gate-control-signal line, and input and output ends of the reset transistor are coupled between the output end of the drive transistor and a reset-voltage terminal.

12. The display panel according to claim 8, wherein each pixel drive circuit further comprises an input control transistor, a control end of the input control transistor is coupled to an emission-signal line, an input end of the input control transistor is coupled to a drive-voltage terminal, and an output end of the input control transistor is coupled to the input end of the drive transistor.

13. The display panel according to claim 8, wherein the flip-elimination circuitry further comprises a flip capacitor, one end of the flip capacitor is coupled to the output end of the drive transistor, and another end of the flip capacitor is coupled to the control end of the drive transistor.

14. The display panel according to claim 8, wherein the plurality of pixel drive circuits are cascaded in the display panel, the first gate-control-signal line, the second gate-control-signal line and the third gate-control-signal line are respectively corresponding to a gate-signal line of a pixel drive circuit at a post-stage adjacent to a pixel drive circuit at a current stage, a gate-signal line of a pixel drive circuit at a fore-stage adjacent to the pixel drive circuit at the current stage, and a gate-signal line of the pixel drive circuit at the current stage.

15. A display device, comprising:

a display panel, comprising:

a plurality of pixels, each pixel comprising a plurality of sub-pixel elements; and a plurality of pixel drive circuits, wherein the plurality of pixel drive circuits are coupled to the plurality of sub-pixel elements in a one-to-one correspondence, and each pixel drive circuit comprises:

a drive compensation circuitry, comprising a storage capacitor and a drive transistor, wherein an input end of the drive transistor is coupled to a drive-voltage terminal, and an output end of the drive transistor is coupled to one of the plurality of sub-pixel elements;

a data-writing circuitry, wherein an output end of the data-writing circuitry is coupled to a control end of the drive transistor, to write a data voltage to the control end of the drive transistor in a writing phase; and a flip-elimination circuitry, wherein the flip-elimination circuitry is configured to write a reference voltage to the control end of the drive transistor through an independent circuit line in a compensation phase, to eliminate a voltage flip formed due to a switching between the data voltage and the reference voltage in the writing phase of the data voltage, wherein the flip-elimination circuitry comprises a flip-elimination transistor, the flip-elimination transistor is a four-terminal device, wherein a control end of the flip-elimination transistor is coupled to a third gate-control-signal line, an input end of the flip-elimination transistor is coupled to the control end of the drive transistor, an output end of the flip-elimination transistor is coupled to a reference-voltage line, and a bottom gate of the flip-elimination transistor is coupled to a direct-current signal line.

* * * * *